United States Patent [19]
Lawrence et al.

[11] 3,882,512
[45] May 6, 1975

[54] CAMERA SYSTEM WITH ON-FRAME DIGITAL RECORDING MEANS

[75] Inventors: Franklin B. Lawrence, Saratoga; Robert E. Lewis, Palo Alto, both of Calif.

[73] Assignee: Timelapse, Inc., Mountain View, Calif.

[22] Filed: June 25, 1973

[21] Appl. No.: 373,043

[52] U.S. Cl. .............................................. 354/109
[51] Int. Cl. ......................................... G03b 17/24
[58] Field of Search ................ 95/1.1; 354/105, 109

[56] References Cited
UNITED STATES PATENTS

| | | | |
|---|---|---|---|
| 3,376,800 | 4/1968 | Faasch | 95/1.1 X |
| 3,495,267 | 2/1970 | Brodie | 346/2.3 |
| 3,502,009 | 3/1970 | Connors | 95/1.1 |
| 3,603,974 | 9/1971 | Copeland | 95/1.1 |
| 3,732,002 | 5/1973 | Wiesler | 95/1.1 |

Primary Examiner—John M. Horan
Attorney, Agent, or Firm—Townsend and Townsend

[57] ABSTRACT

A photographic data recording system including a camera having means for superposing digital data onto the frames of the film used with the camera so that the data will be viewable within the confines of the frames. In a preferred embodiment, the system utilizes a digital clock having display means whose image is directed onto the film frames by way of the optical path extending toward the film plane. The system is especially suitable for time lapse filming of quantitative, time-related events.

6 Claims, 7 Drawing Figures

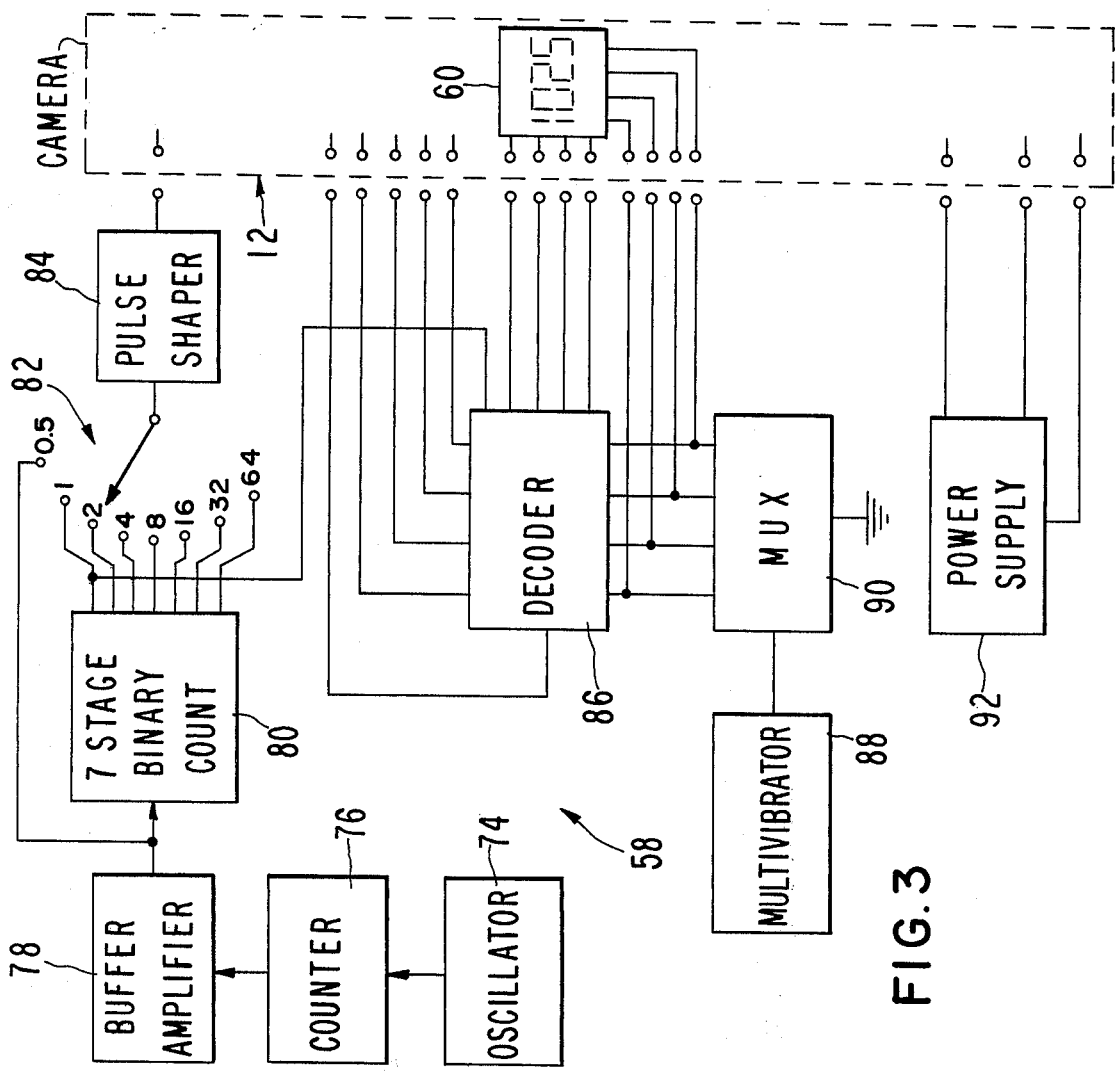
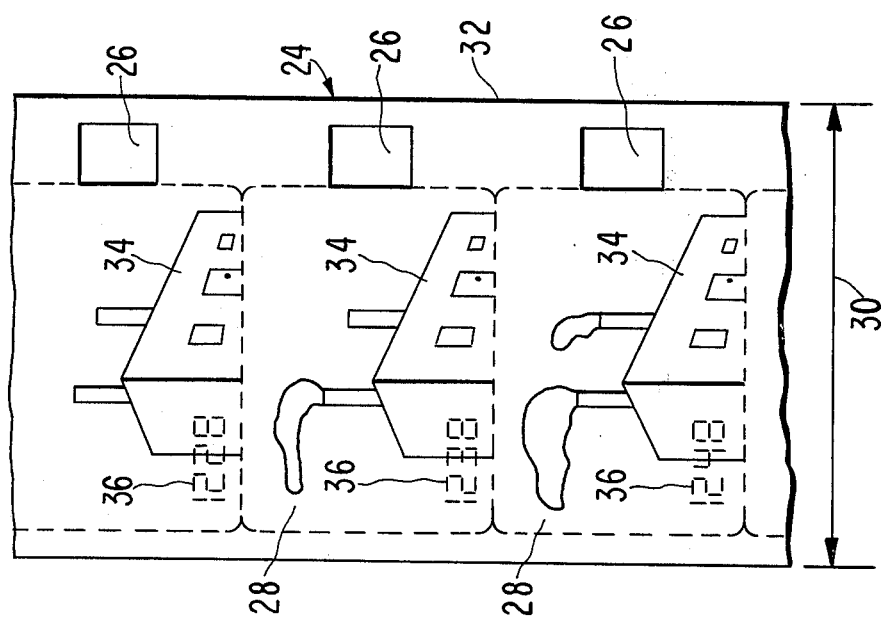

CAMERA SYSTEM WITH ON-FRAME DIGITAL RECORDING MEANS

This invention relates to improvements in the time compression of events using time lapse camera apparatus producing simultaneous event image and superimposed digital data. More particularly, the invention is directed to a photographic recording system in which motion picture records of a day's or such activities seen in a few minutes can be provided with digital time numbers in each picture frame or with randomly pulsed interval data with time and digital data similarly recorded.

BACKGROUND OF THE INVENTION

In photographic data recording, time lapse practice is based upon controlled time intervals in which a camera exposes the film in periods longer than the display period which, upon projection, is seen to shorten the viewing time in relation to the event by a time compression factor. Thus, for instance, growth of botanical specimens as a function of nutrients may be seen in a few moments compared to actual growth time which is much longer in duration. Similarly, the selection of the time of exposure by successive event-initiated exposures provides a means for studying selected phenomona repeatedly for statistical purposes or for possible detection of random occurences, such as time-marked photographic records showing noisy vehicles which trigger exposure by exceeding an acoustic limit.

Time lapse photography is well-known as a means of recording cloud formations and travel. It is also used to survey large outdoor construction activities. This enables study for greater efficiency as well as providing records of errors or possible accidents or refutation of false claims. Time lapse data has been shown to have a large market in the heavy construction industry where equipment investment and operating costs are high and where long time constants of operation beg for the enormous quantitative compression of time which time lapse photography allows as an analytical tool.

In many instances, direct recording of event time on the picture is the most efficient means of enabling data reduction. Similarly, visible time or data-marked time lapse films are considered valuable for planning or estimating subsequent activities.

Very advanced and technically unique methods of photographic data recording are used in studying aerial events such as rocket launchings, using a plurality of gimbal mounted, simultaneously pulsed cameras which expose each of their films simultaneously, while recording time from a central clock transmitted to be imaged on each film with other data such as azimuth and elevation. Thus, by projecting the films one frame at a time upon a screen, measurement of the image in $x$ and $y$ coordinates enables computer data reduction of most spatial characteristics. The images in these units are separate from the data optics images, thereby requiring special optics, if not modification of the whole projector, to view an event as a motion picture.

More economical 16mm film type cameras have been made which photoprint data on unused space between sprocket holes beside the picture frames of a film. This practice retains use of standard camera objective lenses and uses standard viewing frames, a sort of "something for nothing" situation by using unused photo emulsion area. However, the cost of 16mm film is nearly prohibitive for continuous day-in, day-out color records, and the advent of improved 8mm film, commonly called "Super 8" or "S-8 film", has made widespread use practical for many while still retaining acceptable image quality. As S-8 film was designed initially for the best image and performance with little waste, it is not simply a scaled version of 16mm film; even though it is exactly one-half the width.

In 16mm film and in earlier 8mm film, the film perforations or sprocket holes are placed at the corners of the image frames; thus, the space between is beside the image. However, this results in problems in splicing films, as the perforations being at the joint line are weaker. In S-8 film, the perforation is commonly beside the frame to eliminate the related splicing failures. Consequently, the data area between perforations is not accessible; it is also narrower to allow 50% more picture area in S-8 film.

As introduced, S-8 film is sold in cartridges suited for instant single use insertion in the camera, as opposed to the prior double-8 films which required removal and flip-over in the middle resulting in a half length or short run, and also occasional double exposures. The fit of the cartridge and the aperture defining plate of the camera also weigh against use of photo digital imprinting outside the event image area. Thus straightforward use of instant loading S-8 film for time lapse photography with alpha-numeric data has been a problem.

Manual withdrawing of a loop of film from the cartridge avoids some aspects of the problem, but this procedure requires delicate threading of the film through thin slots of the camera mechanism and negates the value of the cartridge, particularly under unfavorable conditions where doing this with work gloves or weather are a factor. In other words, event and alpha-numeric or digital clock exposures have been a problem for photographic data recording with instant load cartridge of S-8 film, and there is need for an improved camera design for this purpose. Such improvements would make photographic data recording feasible on a far broader economic level.

The present invention is directed to an improved photographic data recording system which overcomes the above-mentioned limitations and disadvantages. To this end, the invention utilizes a camera which can be provided with film loaded in a cartridge, such as Super-8 film. The camera is provided with means for forming a digital display, such as the display of a digital clock, and means for directing the image of such display onto image frames of the film used with the camera so that the digital information from the display is readily viewable with the recorded information on the film in a superposed fashion. This feature thereby avoids the necessity for recording such digital information on the margins of the film such as occurs with the use of conventional camera equipment and provides a unique time-related recording effect which clearly identifies the event whose image is recorded on a film frame with the actual time of occurrence so that the two can not be separated from each other such as might occur during splicing. Thus, the on-frame digital display provides a direct identification and mental association of data and event.

In a preferred embodiment of the invention, the display is directed onto the optical path extending toward the film plane. Thus, the images of the display and the image of the object to be recorded are simultaneously directed onto a film frame and disposed within the confines thereof. The display and the optical means for directing its image onto the film are carried in a housing coupled with and adjacent to the camera to allow the displayed image to be readily superposed with the image of the object to be photographed. Moreover, the digital forming means, if it is in the nature of a clock, can be used to trigger the shutter of the camera for photographing a desired event.

The primary object of the invention is to provide an improved photographic recording system which allows digital data to be directed onto and within the confines of the image frames of a photographic film simultaneously with the recording of the images of external objects or events on such film frames so that the images of the objects and the digital data will be inextricably combined on respective film frames to thereby provide a direct correlation between an object or event and data associated with it.

Another object of this invention is to provide a system of the type described wherein the system is suitable for time lapse photography, yet the camera of the system can be of the type utilizing a film pack carried in a cartridge to minimize film loading problems due to weather, lack of camera-handling skills and the like.

Still another object of this invention is to provide a photographic camera apparatus having an electronic digital clock provided with a visual display wherein the apparatus has means for directing the image of the clock display onto and within the boundaries of the image frames of the film of the camera so as to avoid the need for mechanical parts such as springs, indicators, gear trains and the like for use in providing a time indication on the film.

The above and other objects of the invention are achieved by providing, in the preferred embodiment of the invention, an instant film loading capability using S-8 film wherein the system can operate, for example, when an event is likely to occur within a given interval, such as during one day, to photograph the event by time-spaced, pulse-activated exposures onto which film timing information is recorded from precision electronic timing circuitry devoid of mechanical components. As the exposures may be initiated by repeated precise electronic clock generated intervals, as selected, or random event triggered exposure, it becomes economic to see and to time events that no longer require an observer idle for long periods, and who can, in any case, be in many places as with multiple cameras with electronic clock timing cross correlation and/or pulsed lighting.

In the drawings:

FIG. 1 is a fragmentary, side elevational view of a strip of photographic film showing digital data recorded in the film frames thereof;

FIG. 3 is a schematic diagram of the digital clock forming a part of the system;

FIG. 4b is a top plan view taken along line 4b—4b of FIG. 4a; and

Figure 4:
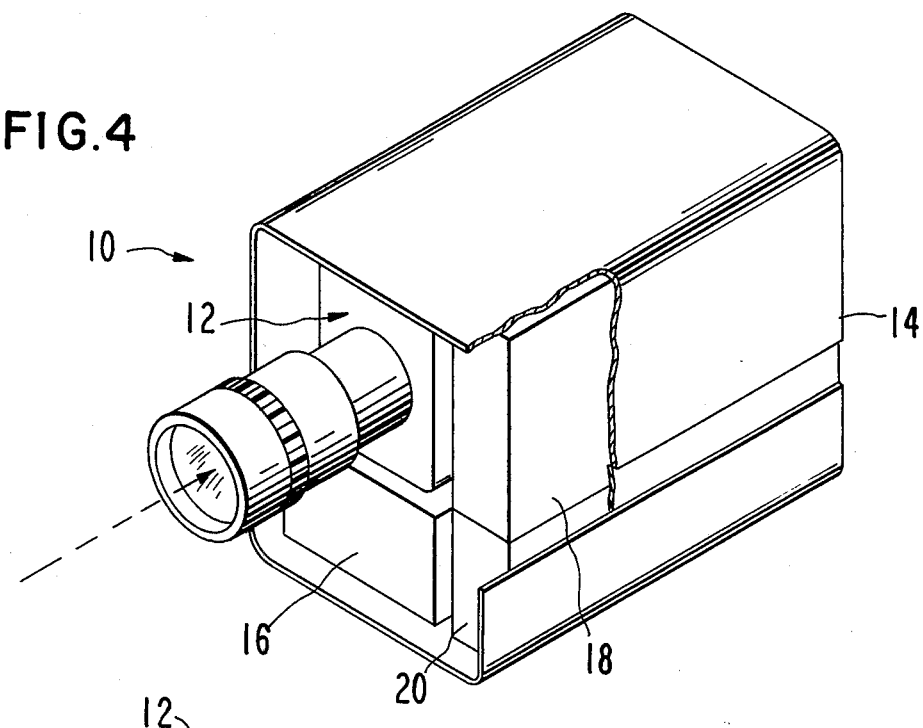
FIG. 4 is a perspective view of the system.
Figure 4A:
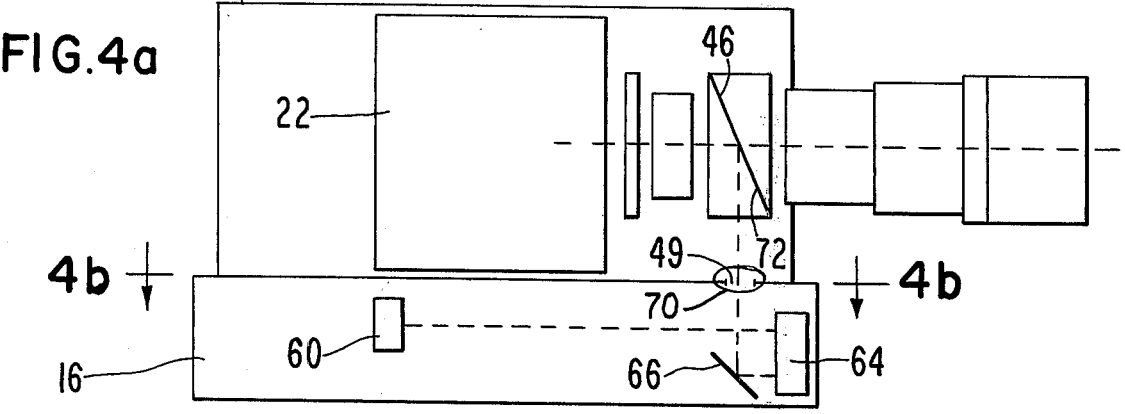
FIG. 4a is a schematic view of the interior of the system.
Figure 4B:
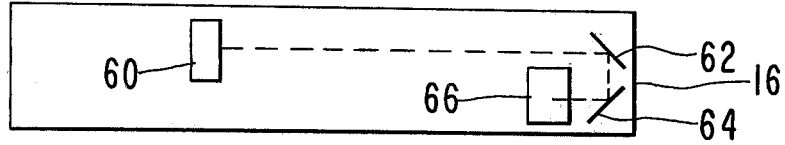

A preferred embodiment of the camera system of the present invention is broadly denoted by the numeral 10 and is shown in an exterior view in FIG. 4. System 10 includes an 8mm movie camera 12 carried within a protective housing 14 which also contains an optical housing 16 below camera 12, a circuitry housing 18 at one side of the camera, and a battery or power supply housing 20 below housing 18. Camera 18 is adapted for use with a film cartridge 22 (FIG. 4a) which contains 8mm Type S film, a strip 24 of which is shown in FIG. 1.

Film 24 has side perforations 26 shown centered in respective image frames 28, the latter being a nominal 4.2 × 6.0 mm size on film whose width is denoted by the numeral 30 and whose reference edge is denoted by the numeral 32. As the image placement and frame edge profile involves the film handling mechanism, the cartridge, the camera optics and photo processing effects, each image frame 28 is commonly made to overlap the sprocket hole 26 or corresponding perforation and come to be contiguous as near as practical if not coincident to the adjacent image frames 28 though not overlapping by double exposure. Perforations for S-8 film were approved by the International Organization for Standardization (ISO) on Apr. 15, 1972, being in complete accord with American National Standard Dimensions for 8mm Motion-Picture Film Perforated Super 8, 1 R-1667, PH22,149-1967. The S-8 film geometry indicates the relative impossibility of displaying data off-frame as is commonly done on 16mm and larger films.

FIG. 1 also shows the on-frame placement of digital data realized by the use of system 10 in a time-lapse mode. To this end, three consecutive image frames 28 are shown as having images 34 of an external object, such as a factory having two smokestacks. The image frames also shows images 36 of digital data, such as the image of a display of a digital clock superposed onto film frames 28 and disposed within the confines thereof. For purposes of illustration, images 36 are near the lower left-hand corner of respective film frames 28 and they overlap images 34. Since images 36 can be formed from a display using light-emitting diodes, such images do not obliterate images 34. Thus, the informational content of the film frames remains essentially intact notwithstanding the presence of the digital information provided by images 36.

Figure 2:
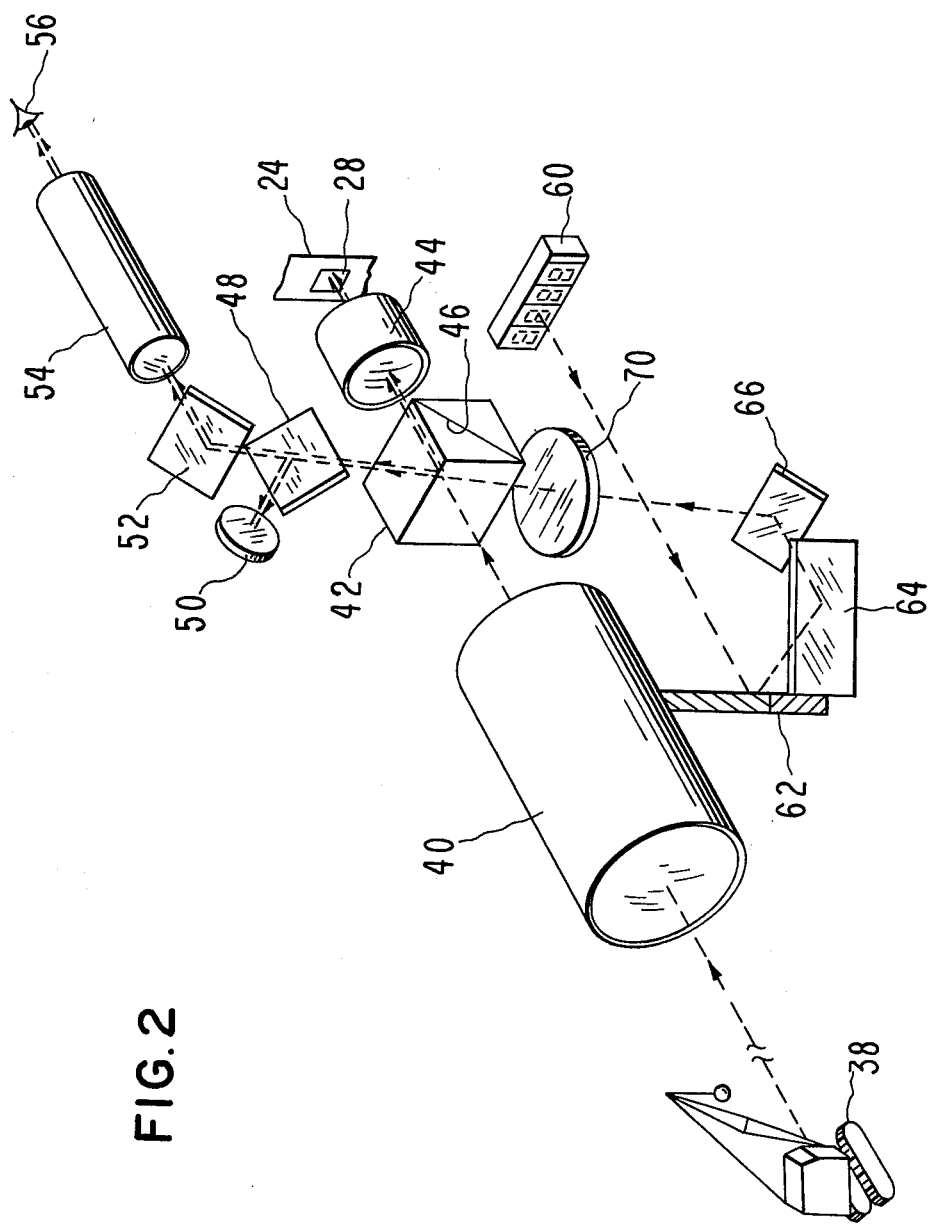
FIG. 2 is a schematic perspective view of the optics utilized with the system of the invention.

The optical system of the invention is shown schematically in FIG. 2 wherein light rays from an object or event 38 enter the afocal optics 40 which provide variable magnification, or field of view for record visibility, and also operate to focus the emerging ray bundles to substantially a standard infinity focus. The ray bundles pass through prism 42 and focus by objective lens 44 to an image on an image frame 28 of film 24. Prism 42 is a plane parallel entrant-exit face prism with a 45°, partially reflective, mostly transmissive upper face 46 which directs a small portion of the ray bundles upwardly to a beam-splitter reflector 48 which directs the same onto a photocell 50. Pupil division or field selection options can also be used. The upward rays coming through reflector 48 are reflected by a mirror 52 into the alignment and focus optics 54 which includes a focus detection construction of prismatic microgrid character or ground glass or such, and a mask defining the field of view seen upon projection, which of necessity must be slightly reduced from the film frame size to allow for tolerances of mechanical mask frame edge and alignment effects. When the camera operator views the image at 56, as this is a single lens reflex system, no parallax occurs due to distance, and what he witnesses is the actual scene of the event.

System 10 also includes a digital clock 58 (FIG. 3) having a digital display 60 formed from four side-by-side light-emitting diodes of conventional construction, each diode being operable to display any number from 0 to 9 as is well-known. Display 60 is disposed in house 16 (FIG. 4) along with three image orientation mirrors 62, 64 and 66 arranged to direct the light rays representing the image of display 60 upwardly from housing 16 through an opening 49 (FIG. 4a) through a lens 70 for infinity focus of the rays, the latter being directed onto the lower entrant face 72 (FIG. 4a) of prism 42. Thus, the rays from display 60 "mix" with the rays from object 38 and are at the same focus so that they simultaneously are directed onto an image frame 28 of film 24.

The circuit of clock 58 is contained in housing 18 (FIG. 4) and is shown in block diagram form in FIG. 3, wherein the output signal of a quartz crystal oscillator 74 operating at 16.384KHz is coupled to the input of a CMOS oscillator counter 76 which divides the oscillator frequency by a factor of $2^{13}$ resulting in an output signal having a frequency of 2Hz. The 2 Hz signal is fed through a buffer amplifier 78 to a seven-stage binary divider 80 and a selector switch 82. The seven outputs of divider 80 are fed to switch 82 where, combined with the 2 Hz signal from amplifier 78, they result in output pulses at intervals of ½ second, 1 second, 2 second, 4 second, 8 second, 16 second, 32 second and 64 second. Thus, by means of switch 82, any one of the eight intervals may be selected and, when the signal with the desired pulse width is shaped and amplified by pulse shaper and amplifier 84, it can be used to trigger the framing mechanism of camera 12.

The 1 Hz pulse is fed to a 12-hour clock decoder 86 where it is divided by 60 to derive minutes, minutes are divided by 10 to give tens of minutes and tens of minutes are divided by six to give hours, hours are divided by 10 to give tens of hours. The minute, tens of minutes, hours and tens of hours information is decoded and held available to drive display 60. An astable multivibrator 88 is used to generate a strobe frequency which when presented to the multiplexer 90 results in four time-displaced pulses being generated in a regular and repeated pattern. Such time-displaced pulses are used to gate successively the display enable signals from decoder 86 for minutes, tens of minutes, hours and tens of hours. The use of multiplexing feature reduces the duty cycle on each individual digit display to 25 percent since only one digit at a time is powered, resulting in maximum brilliance at reduced power. Since the power to enable the display is available only for the time during which the camera drive motor is being operated, this results in total effective duty cycle at the maximum rate of framing (0.5 sec.) of 50 milliseconds divided by 500 milliseconds times 25% or 10% times 25%, which results in an actual duty cycle of 2.5%, thereby minimizing battery drain and attendant display temperature rise.

A power supply 92 in battery housing 20 is required to provide a source of power to operate system 10. This power supply consists of a rechargeable direct current supply with a battery "floating" across the output. The battery can have sufficient capacity to operate system 10 at minimum interval for approximately 8 hours.

Figure 5:
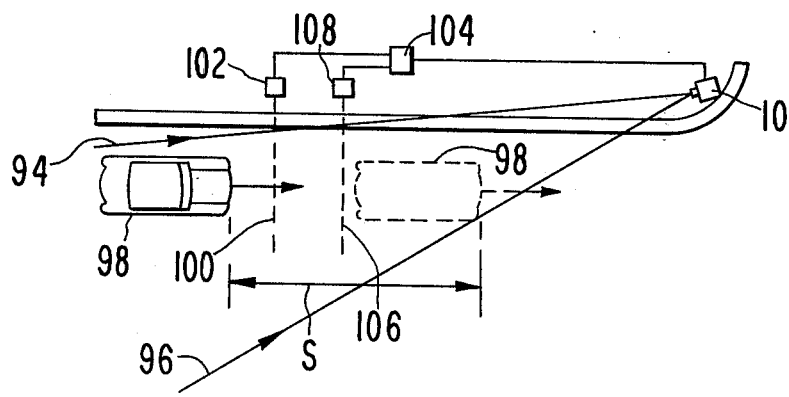
FIG. 5 is a schematic plan view of a scene involving a time-related event with which the system can be utilized.

System 10 is suitable for a wide variety of time lapse recording applications. One application using external switches 102 and 104 for vehicle velocity determination is shown in FIG. 5, wherein system 10 is placed at a location on a median strip of an expressway with the angular field of view of the system being between imaginary points 94 and 96. Camera 12 of system 10 can thus view an approaching motor vehicle 98 which, upon activating the trigger strip 100 of switch 102 starts a velocity computation by a logic box 104 and terminates such computation by activating a trigger strip 106 of switch 104. Vehicle 98 will have traversed a distance S in the time interval defined by the activation of trigger strips 100 and 106 and, by dividing the distance by the elapsed time, the velocity is obtained.

If system 10 is properly placed relative to the path of vehicle 98, the vehicle license number and other identifying characteristics can be obtained. Moreover, the change in image size on the film frames of the camera may be used to provide a verification of velocity.

From the above description, it will be apparent that system 10 is of significant value in facilitating economic quantitative and precise time, rate and such analysis of events with the convenience and speed of instant loading magazine Super-8mm film cartridges using a maximum of commercial components for ready service and maintenance. For example, by addition of the optical data train to the NIZO brand S-55 Super 8mm camera with clock 58 and other system components described, it is possible that system 10 can have the following performance characteristics:

Format: Super 8mm cartridge loading.
Optics: f/1.8 varigon zoom from 7 to 56mm EFL, made by Schneider (Kreuanach, Germany)
Viewing: Single lens reflex, field and focus.
Transport: Braun Nizo Electric.
Timelapse Intervals (Seconds) (to + 0.01%); 0.5, 1,2,4,8,16,32,64.
Motion Picture Speeds (not clock controlled): 18, 24, 54 frames/sec.
Auto Exposure Range: ASA 25–160.
Manual Exposure Control: f/1.8–f/22.
A. C. Charge/Run: 110–125 volts, 60 Hz.
Battery: Gel Cel GC 826, 8V, 2.6 Amp-hrs.
Charge Indicator: Meter.
Charge Time From Full Drain: 10–12 hours.
Dimensions: 4.375 × 8.75 × 11.25 inches.
Weight: 9.75 pounds.
Clock IMage Color: Red, (film and viewing).

The use of color, polarizing and neutral density, as well as so-called sky filters, mat-boxes and other well-known cinematographic aids will be seen to add to readily evident needs in many instances. The invention can be used with a wide variety of films, lighting and lay-outs to improve the value of time lapse recording by quantitative time data. An airborne camera can be operated in time with others for example.

To those skilled in the art to which this invention relates, many changes and differing embodiments will suggest themselves without departing from the spirit and scope of the invention. For example, dividing the field of view by a large mirror far in front of the camera enables triangulation. Furthermore, although the mechanical/optical system of the image-date-exposure-finder-focus optics are shown on axis, it should be understood that this is not requisite and non-axially aligned elements could be substituted.

We claim:

1. A camera system comprising: a single lens reflex camera having an optical axis, an actuatable shutter mechanism, a film plane intersecting the optical axis, a first lens operable to focus light rays to substantially a standard infinity focus, an optical device having a partially reflective face between the first lens and the film plane, said face being transmissive to the light rays from said first lens, a second lens between said optical device and said film plane, and means for receiving a film having a plurality of image frames thereon and for placing the film at said film plane to permit the image frames to move successively into optical alignment with said optical axis, whereby light rays representing the image of an external object can be directed into the camera through said first lens, said optical device and said second lens and onto an image frame aligned therewith; an electronic digital clock circuit; an actuatable visual display device, said circuit being coupled with said shutter mechanism and said display device for simultaneously actuating the same; and means optically coupled to said optical device for directing an image of said display onto said face for reflection toward an image frame aligned with said lens assembly.

2. A camera system as set forth in claim 1, wherein said device includes a plane parallel entrant-exit face prism having an inclined, partially reflective face.

3. A camera assembly as set forth in claim 2, wherein is included a mirror between said face and said display, said mirror being disposed to direct the light rays from said display onto said face.

4. A camera assembly as set forth in claim 1, wherein said camera has a housing having an opening through the bottom thereof, there being a second housing below said camera housing, a power supply for said circuit, said display device being in said second housing, there being mirror means in the second housing for directing the light rays from said device through said opening and into said camera housing, and including a third housing at one side of said camera, the circuit being in the third housing and a fourth housing below the third housing, said power supply being in the fourth housing.

5. A camera as set forth in claim 1, wherein said circuit has means for varying the rate at which said shutter mechanism is actuated.

6. A camera assembly as set forth in claim 1, wherein said receiving means includes structure defining a compartment for receiving a film cartridge containing 8mm film.

* * * * *